(12) United States Patent
Bennett et al.

(10) Patent No.: US 10,523,513 B2
(45) Date of Patent: Dec. 31, 2019

(54) AUTOMATED CONFIGURATION OF SWITCH ZONES IN A SWITCH FABRIC

(71) Applicant: Virtustream IP Holding Company LLC, Bethesda, MD (US)

(72) Inventors: Christopher S. Bennett, Canton, GA (US); Matthew L. Welch, Riverview, FL (US); Kevin Harlan, Sandy Springs, GA (US); Andrew J. Gonczi, Woodstock, GA (US); Jason Hedden, Joliet, IL (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 100 days.

(21) Appl. No.: 15/966,851

(22) Filed: Apr. 30, 2018

(65) Prior Publication Data

US 2019/0334774 A1 Oct. 31, 2019

(51) Int. Cl.
*H04L 12/24* (2006.01)
*H04L 12/931* (2013.01)
*H04L 29/12* (2006.01)
*G06F 16/955* (2019.01)

(52) U.S. Cl.
CPC ...... *H04L 41/0893* (2013.01); *H04L 41/0843* (2013.01); *H04L 41/0869* (2013.01); *H04L 41/0886* (2013.01); *H04L 41/12* (2013.01); *H04L 49/357* (2013.01); *H04L 61/6045* (2013.01); *G06F 16/955* (2019.01)

(58) Field of Classification Search
None
See application file for complete search history.

(56) References Cited

U.S. PATENT DOCUMENTS

| 7,003,527 | B1 * | 2/2006 | Lavallee | H04L 41/0803 |
| 7,397,788 | B2 * | 7/2008 | Mies | H04L 12/42 370/230 |
| 9,712,613 | B2 * | 7/2017 | Balasubramanian | H04L 29/06 |

(Continued)

OTHER PUBLICATIONS

Amita Wasson, "General Rules and Limits for Auto-Provisioning on Symmetric VMAX," http://community.emc.com/docs/DOC-16553, May 8, 2012, 2 pages.

*Primary Examiner* — Backhean Tiv
(74) *Attorney, Agent, or Firm* — Ryan, Mason & Lewis, LLP (57) ABSTRACT

A method includes obtaining a switch zone set configuration for a switch fabric, the switch zone set configuration comprising one or more switch zones each comprising one or more of host devices interconnected with one or more storage systems via one or more Fibre Channel (FC) switches. The method also includes provisioning the switch zone set configuration in the FC switches and enabling FC ports of the FC switches and establishing the one or more switch zones of the switch zone set configuration in the storage systems. The method further includes validating connectivity by determining whether specified FC ports of the FC switches are connected to specified host bus adapter (HBA) ports of the host devices and the storage systems in accordance with the provisioned switch zone set configuration, and activating the one or more switch zones in an infrastructure environment responsive to successful validation of the connectivity.

20 Claims, 6 Drawing Sheets

(56) References Cited

U.S. PATENT DOCUMENTS

| | | | | | |
|---|---|---|---|---|---|
| 2001/0054093 | A1* | 12/2001 | Iwatani | | H04L 41/08 709/223 |
| 2003/0195956 | A1* | 10/2003 | Bramhall | | G06F 3/0601 709/223 |
| 2003/0208581 | A1* | 11/2003 | Behren | | H04L 41/12 709/223 |
| 2004/0073648 | A1* | 4/2004 | Tanino | | H04L 41/0663 709/223 |
| 2004/0081186 | A1* | 4/2004 | Warren | | H04L 12/433 370/419 |
| 2006/0036736 | A1* | 2/2006 | Kitamura | | H04L 41/0813 709/226 |
| 2006/0106819 | A1* | 5/2006 | Dhanadevan | | G06F 3/0605 |
| 2007/0239989 | A1* | 10/2007 | Barnett | | H04L 63/101 713/185 |
| 2007/0242617 | A1* | 10/2007 | Ichimura | | H04L 29/12594 370/252 |
| 2007/0294563 | A1* | 12/2007 | Bose | | G06F 11/2092 714/5.11 |
| 2009/0282135 | A1* | 11/2009 | Ravindran | | G06F 9/4416 709/222 |
| 2010/0131950 | A1* | 5/2010 | Yamada | | G06F 3/0605 718/1 |
| 2011/0296230 | A1* | 12/2011 | Chen | | H04L 49/357 714/3 |
| 2012/0163374 | A1* | 6/2012 | Shah | | H04L 12/413 370/357 |
| 2013/0019001 | A1* | 1/2013 | Winokur | | H04L 67/1097 709/223 |
| 2013/0046892 | A1* | 2/2013 | Otani | | G06F 15/173 709/226 |
| 2015/0089015 | A1* | 3/2015 | Rosset | | H04L 67/1097 709/215 |
| 2016/0050277 | A1* | 2/2016 | Kirk | | H04L 67/1097 370/392 |
| 2016/0380804 | A1* | 12/2016 | Amano | | H04L 45/22 709/239 |
| 2017/0134220 | A1* | 5/2017 | Chen | | H04L 41/0806 |
| 2018/0026863 | A1* | 1/2018 | Hughes | | H04L 43/06 709/224 |
| 2019/0020603 | A1* | 1/2019 | Subramani | | H04L 49/357 |
| 2019/0319846 | A1* | 10/2019 | Dhanadevan | | H04L 41/12 |

* cited by examiner

AUTOMATED CONFIGURATION OF SWITCH ZONES IN A SWITCH FABRIC

FIELD

The field relates generally to information processing systems, and more particularly to switch fabrics in computer networks.

BACKGROUND

A switch fabric, also referred to as a switching fabric or a switched fabric, provides a network topology for interconnecting nodes via one or more switches. In a Fibre Channel (FC) switch fabric topology, nodes or devices are connected through one or more FC switches. FC zoning may be used to control visibility among the nodes or devices in the FC switch fabric by partitioning the FC switch fabric into subsets or zones with simplified management and added security where nodes or devices within a zone are generally allowed access only to other nodes or devices in that zone. FC zoning may be implemented using a variety of techniques, including soft and hard zoning, through switch ports, through World Wide Names (WWNs) of nodes or devices, etc.

SUMMARY

Illustrative embodiments of the present invention provide techniques for automated configuration of switch zones in a switch fabric.

In one embodiment, a method comprises obtaining, from a configuration database, a switch zone set configuration for a switch fabric in an infrastructure environment comprising a plurality of host devices, a plurality of FC switches and a plurality of storage systems, the switch zone set configuration comprising one or more switch zones each comprising one or more of the host devices interconnected with one or more of the storage systems via one or more of the FC switches. The method also comprises provisioning the switch zone set configuration in the FC switches of the infrastructure environment and enabling FC ports of the FC switches and establishing the one or more switch zones of the switch zone set configuration in the storage systems of the infrastructure environment. The method further comprises validating connectivity of the FC switches to the host devices and the storage systems by determining whether specified FC ports of the FC switches are connected to specified host bus adapter (HBA) ports of the host devices and the storage systems in accordance with the provisioned switch zone set configuration and activating the one or more switch zones in the infrastructure environment responsive to successful validation of the connectivity of the FC switches to the host devices and the storage systems. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
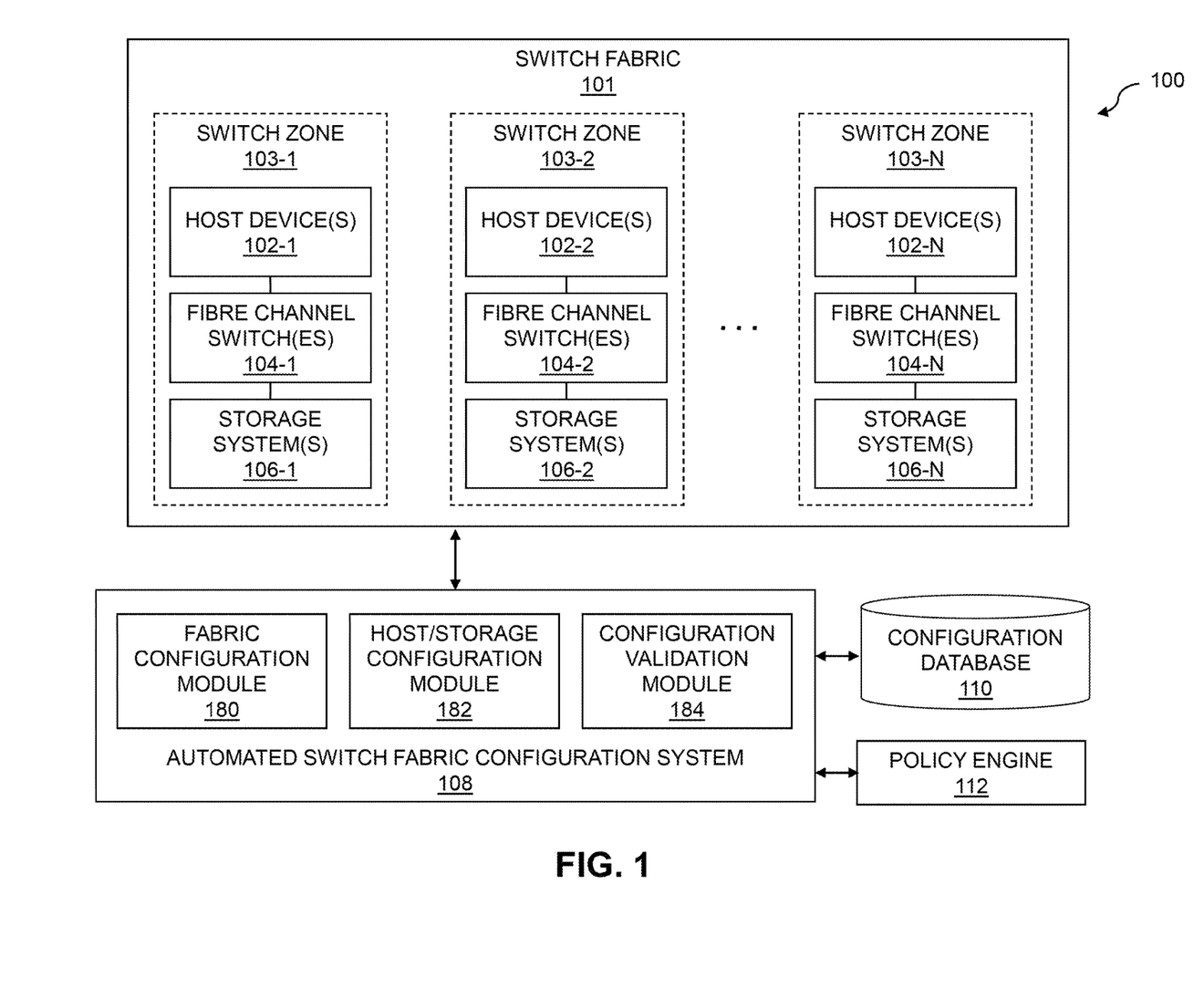
FIG. 1 is a block diagram of a computer network including an automated switch fabric configuration system in an illustrative embodiment of the invention.

FIG. 1 shows an information processing system 100 configured in accordance with an illustrative embodiment of the invention. The information processing system 100 comprises a switch fabric 101 including a number of switch zones 103-1, 103-2, . . . 103-N (collectively, switch zones 103). Each of the switch zones 103 includes one or more host devices 102-1, 102-2, . . . 102-N (collectively, host devices 102) and storage systems 106-1, 106-2, . . . 106-N (collectively, storage systems 106) interconnected by one or more Fibre Channel (FC) switches 104-1, 104-2, . . . 104-N (collectively, FC switches 104).

The host devices 102 may comprise servers or other processing devices. The host devices 102 in some embodiments are compute nodes that are part of a cloud infrastructure such as an Amazon Web Services (AWS) system. Other examples of cloud-based systems that can be used to provide host devices 102 and possibly other portions of system 100 include Google Cloud Platform (GCP) and Microsoft Azure.

In various embodiments described herein, the host devices 102 are connected to the storage systems 106 via FC switches 104. It should be appreciated, however, that other types of switches may be used in other embodiments.

The storage systems 106 may include storage arrays or other types of storage devices. The storage systems 106 may in some embodiments include a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems 106 in other embodiments.

The term "storage system" as used herein is therefore intended to be broadly construed. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 106 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing the storage systems 106 in an illustrative embodiment.

Switch zones 103 of the switch fabric 101 are used to provide security, such that devices (e.g., host devices 102 and storage systems 106) within each of the switch zones 103 have visibility to other devices in that particular switch zone. It should be appreciated that a particular device (e.g., one or more of the host devices 102 and/or storage systems 106) may be a member of multiple switch zones, and that a single one of the FC switches 104 may be part of the switch fabric for multiple different switch zones. Management of the switch zones 103 of the switch fabric 101 is a complex and difficult task, particularly in systems including large numbers of host devices 102, FC switches 104 and storage systems 106 arranged in various switch zones 103.

Ensuring that cabling and other interconnects among the host devices 102, FC switches 104 and storage systems 106 are in a desired configuration is a difficult task, which is further complicated as host devices 102, FC switches 104 and storage systems 106 are added and removed from the switch fabric 101 (e.g., shut down and rebooted, replaced with new hardware, etc.). Cable or other interconnect validation is also complex, as a desired configuration may require that particular cables or interconnects are connected to particular ports (e.g., including multiple ports for redundancy) on the host devices 102, FC switches 104 and storage systems 106 of the switch zones 103.

In the FIG. 1 embodiment, an automated switch fabric configuration system 108 is provided for programmatically configuring interconnects among the host devices 102, FC switches 104 and storage systems 106 in the switch zones 103 of the switch fabric 101. In some embodiments, such interconnects are programmatically configured based on a set of pre-defined rules, obtained or derived from information in a configuration database 110 using a policy engine 112. The configuration database 110 may store a desired configuration for the switch zones 103 of the switch fabric 101. The policy engine 112, which may be implemented using Boolean logic, permits the automated switch fabric configuration system 108 to develop the pre-defined rules used in programmatically configuring the switch zones 103 of the switch fabric 101. The automated switch fabric configuration system 108 thus enables consistent deployment and validation of infrastructure components (e.g., rack-based infrastructure components) including host devices 102, FC switches 104 and storage systems 106 and cabling or interconnects therebetween without human intervention.

The automated switch fabric configuration system 108 in some embodiments provides new services based on policies or rules that dictate a minimum viable configuration for a working and resilient switch fabric (e.g., within a rack) for Infrastructure-as-a-Service (IaaS) or other cloud computing-based consumption. The automated switch fabric configuration system 108 can utilize application programming interfaces (APIs) of hardware such as host devices 102, FC switches 104 and storage systems 106 to create pseudo-drivers for discovery as workers and interfaces with upstream and downstream automation tools (e.g., APIs) and processes for configuring and validating working configurations.

Currently, user intervention (e.g., manual or scripted through command line interfaces (CLIs) or user interfaces (UIs)) is required to activate, configure and validate proper cabling or other interconnects between host devices 102 (e.g., compute nodes), FC switches 104 and storage systems 106 (e.g., enterprise storage array systems) when building a self-contained rack or other infrastructure. Automated switch fabric configuration system 108 can eliminate human error by first connecting to configuration database 110 and policy engine 112 to look up or develop rules for application to pre-defined configuration sets and then automatically configuring the infrastructure for use.

In some embodiments, the automated switch fabric configuration system 108 is implemented as software within a cloud computing node of a management area for the switch fabric 101. The automated switch fabric configuration system 108 may have Internet Protocol (IP) or Ethernet connectivity to the host devices 102, FC switches 104 and storage systems 106, with the host devices 102, FC switches 104 and storage systems 106 being interconnected via Fibre Channel connections.

An automated fabric configuration process may start with an assumption that the hardware (e.g., host devices 102, FC switches 104 and storage systems 106) in an infrastructure environment (e.g., a rack, data center, etc.) is physically installed, cabled or interconnected, powered on, etc. Further, site services such as IP addressing, IP networking, etc. are assumed to be in place and operational. The storage systems 106 are assumed to be up and running, such as with at least a "Level 1" install with management interfaces configured, connecting and running with at least default credentials if not with specified credentials. Inter-switch links (ISLs) are further assumed to be configured and connected, with licensing and features installed and enabled in a running state ready for configuration. In some cases, the site or target environment to be configured is "greenfield" (e.g., with no previous configuration), or at least in a state where any existing setup will not need to be managed and configured (e.g., any existing zoning or setup does not need to be discovered, ingested and understood, etc.). In some cases, by cloning an active switch zone set and modifying the active switch zone set, the automated switch fabric configuration system 108 need only add or remove what is known without a need to understand anything already in that switch zone set.

The automated switch fabric configuration system 108 includes a number of functional modules including fabric configuration module 180, host and storage configuration module 182 and configuration validation module 184. The fabric configuration module 180 configures the FC switches 104, such as by aliasing switch port names to reflect information for the host devices 102 and storage systems 106. The fabric configuration module 180 is also configured to clone a running active switch zone set to a new switch zone set, and create new switch zones 103 in the new switch zone set (e.g., in accordance with a desired configuration from configuration database 110 and rules obtained or derived from policy engine 112). In some embodiments, this is achieved by mapping World Wide Port Names (WWPNs) of the host devices 102 to WWPNs of the storage systems 106. The World Wide Name (WWN) system may thus be used in some embodiments to establish the switch zones 103 defining which of the host devices 102 and storage systems 106 are visible to one another. The fabric configuration module 180 is further configured to activate and distribute the new switch zone set in the switch fabric 101.

The host and storage array configuration module 182 configures host devices 102 and storage systems 106. In some embodiments, this involves creating an initiator (e.g., host) group, which may be named after or associated with a storage array or storage cluster (e.g., a Symmetrix VMAX® storage array). The host group, along with the port group and masking view described below, are logical grouping functions that may be used within one or more of the storage systems 106. Specific details regarding the host or initiator group, port group and masking view described below are with reference to a VMAX® storage platform. The host or initiator group is used to group hosts with the same connectivity requirements (e.g., members of a single cluster or fault tolerance group). The host or initiator group contains a unique WWN or HBA address in hexadecimal form that is assigned to a human-friendly alias within the storage array. Host devices 102 are zoned to the storage array and must be visible to the storage array (e.g., via the FC switch platform) before they can be added to a host or initiator group. Advantageously, some embodiments can eliminate the need for manual creation and maintenance of a host or initiator group and replace it with more accurate, programmatic methods of operation described herein.

The host and storage array configuration module 182 also creates a port group, which may also be named after or associated with a storage array or storage cluster. The port group in some embodiments is a logical grouping or separation of front-end ports on a VMAX® or other storage platform of one or more of the storage systems 106. The port group includes the ports that connect to the FC switches 104, and contain the unique WWNs or HBA addresses in hexadecimal form that may be assigned to human-friendly aliases within the storage array.

The host and storage array configuration module 182 may be further configured to create a masking view, which may similarly be named after or associated with a storage array or storage cluster. The masking view in some embodiments is a combination of the host group and port group with a storage group (e.g., logical storage devices presented by a storage array of one or more of the storage systems 106 for storage consumption). The masking view provides a final configuration step in enabling host devices 102 to consume the storage capacity from a shared storage array of one or more of the storage systems 106. In some embodiments, creating a masking view requires that a storage group contain at least one entry (e.g., the only group allowed to be empty is the initiator group). To handle this, some embodiments may create a small logical unit (LUN) that can be detected and later deleted. Various other techniques may be used to create any required storage group and add it to the masking view. The masking view permits subdivided access to a given port. Thus, several LUNs of a particular storage array may be accessed through the same FC port of a storage system 106, although server or host masks can be set to limit the access of host devices 102 to the appropriate LUNs of the storage system 106. This masking may be done at the HBA level on the storage systems 106, or possible at the switch level via FC switches 104.

The host and storage array configuration module 182 is further configured to create one or more hosts (e.g., name, populate initiators). In addition, a host initiator path is populated, including a sub-type of the host initiator which may be a sub-type of host for FC host initiators. The host and storage array configuration module 182 may further analyze the hosts to add and remove LUNs inside host objects.

Configuration validation module 184 performs various validation operations, including validation of the configuration of switch zones 103, validation of switch port connections of the FC switches 104, and validation of HBA connections on the host devices 102. Such validation may include validating that ports (e.g., of host devices 102, FC switches 104 and storage systems 106) are spread appropriately across the switch fabric 101 and switch zones 103. The configuration validation module 184 may also validate that particular ports are properly mapped to associated ports and resources.

In some embodiments, the configuration validation module 184 of automated switch fabric configuration system 108 is implemented as a utility that can be launched in different modes. In a "validate only" mode, the configuration validation module 184 validates: (i) switch zoning configuration; (ii) switch port connections; and (iii) host HBA connections. In an "update" mode, the configuration validation module 184 similarly validates (i)-(iii), and also applies missed or changed settings and re-validates as needed. Illustrative examples of validation procedures (i)-(iii) which may be performed by the configuration validation module 184 will now be described in further detail.

(i) Validate Switch Zoning Configuration

To begin, the configuration validation module 184 obtains a list of the FC switches 104, such as from the configuration database 110. The configuration validation module 184 then loops through each of the FC switches 104 to validate the various switch zones 103 of the switch fabric 101. The (currently selected) FC switch 104 is checked for any unsaved changes. If there are unsaved changes and the configuration validation module 184 is in the "validate only" mode, the switch zoning configuration validation procedure is aborted and an error message is returned. If there are unsaved changes and the configuration validation module 184 is in the "update" mode, the process continues.

Next, the configuration validation module 184 performs a check to determine whether a specified switch zone set for the FC switch 104 exists. When in the "update" mode, if the specified switch zone set does not exist the configuration validation module 184 creates the specified switch zone set and then validates the switch zone set creation operation.

The configuration validation module 184 then gets a list of defined or expected connections to the FC switch 104 from the configuration database 110. The defined switch connections for FC switch 104 are processed (e.g., one by one) by building a set of switch zones and their members (e.g., associated ones of the host devices 102 and storage systems 106). For each member, a WWPN is obtained, along with a connection type (e.g., target or initiator), and all storage paths for the connection from the configuration database 110. A list of zone names and their zone members is then compiled.

The list of zones and zone members is then analyzed to validate that the zone name exists in the configuration of the FC switch 104. If the zone name does not exist and the configuration validation module 184 is in the "update" mode, the zone name is added to the switch configuration and the zone adding operation is validated. If the zone name does not exist and the configuration validation module 184 is in the "validate only" mode, an error is flagged.

The configuration validation module 184 then validates that zone members are in the specified zones. If a zone member does not exist and the configuration validation module 184 is in the "update" mode, the member is added to the zone and the zone member add operation is validated.

If the zone member does not exist and the configuration validation module 184 is in the "validate only" mode, an error is flagged.

Next, the configuration validation module 184 validates that the specified zone set contains the specified zones. First, the configuration validation module 184 validates that the specified zone set exists, and if not flags an error. If a specified zone is not in the specified zone set and the configuration validation module 184 is in the "update" mode, the zone is added to the zone set and the zone add operation is validated. If the specified zone is not in the specified zone set and the configuration validation module 184 is in the "validate only" mode, an error is flagged.

After validating that the specified zone set contains the specified zones, the configuration validation module 184 validates whether the specified zone set is active. If the specified zone set is not active and the configuration validation module 184 is in the "update" mode, the zone set is activated and the zone set activation operation is validated. If the specified zone set is not active and the configuration validation module 184 is in the "validate only" mode, an error is flagged.

The configuration validation module 184 then commits the switch configuration and provides results for the switch configuration validation operation for the currently selected FC switch 104. If there are additional FC switches 104 to check, the process loops back. Otherwise, the switch zoning configuration validation procedure is completed.

(ii) Validate Switch Port Connections

To begin, the configuration validation module 184 obtains a list of the FC switches 104 from the configuration database 110. The configuration validation module 184 then loops through each of the FC switches 104 to validate the switch port configurations of each of the FC switches 104. Initially, the configuration information for a (currently selected) FC switch 104 is validated to determine whether it contains the capabilities and information needed for the validation process. If unsuccessful, the switch port connection validation process for the currently selected FC switch 104 is aborted.

Assuming the configuration information for the currently selected switch 104 is validated, the configuration validation module 184 gets all the expected port connections for the FC switch 104 from the configuration database 110. Next, the configuration validation module 184 gets all the current, actual connections to and from the FC switch 104. The actual connections for the FC switch 104 are then analyzed in turn to determine status and provide results. This includes determining whether a connection is expected (e.g., whether it is in the list obtained from configuration database 110). If the connection is not expected, an error is flagged. If the connection is expected, the connection is noted or marked as found and the connection is validated as to whether it is on the correct or expected port. If the port is correct, the connection is noted as valid and the configuration database 110 is updated with success information for this connection. Otherwise, it is noted that the connection was found but that the connection is not on the right port. The above is repeated for each actual connection of the currently selected FC switch 104, and then status results for each actual connection are provided. If there are additional FC switches 104 to check, the process loops back. Otherwise, the switch port connection validation procedure is completed.

(iii) Validate Host HBA Connections

To begin, the configuration validation module 184 gets a list of host devices 102 from the configuration database 110. The configuration validation module 184 then loops through each of the host devices 102 to validate its associated HBA configuration. A list of all HBAs for the currently selected host device 102 is obtained from the configuration database 110. The configuration validation module 184 then connects to the host and gathers a list of all installed HBAs. A check is performed to determine whether the HBA attributes and port interfaces found inside the host device 102 (e.g., via the installed HBAs) are defined in the configuration database 110. The list of HBAs for the host device 102 obtained from the configuration database 110 are then examined in turn.

If an expected HBA (e.g., one of the HBAs in the list of HBAs for the host device 102 obtained from the configuration database 110) is installed on the host device 110, the HBA attributes for that HBA on the host device 102 are checked. If the HBA attributes do not match or are not in the configuration database 110 and the configuration validation module 184 is running in the "update" mode, the configuration database 110 is updated with any newly-found attributes and the attribute update operation is validated. Next, the HBA ports are checked to see if they are defined in an interface list in the configuration database 110. If a port is not in the interface list in the configuration database 110 and the configuration validation module 184 is running in the "update" mode, the port is added to the interface list and the port add operation is validated.

Once the above is completed for the list of HBAs from the configuration database 110 for the currently selected host device 102, and if the configuration validation module 184 is running in the "update" mode, the list of HBAs for the currently selected host device 102 in the configuration database 110 is refreshed or rebuilt.

Next, the configuration validation module 184 validates that the HBA configurations for the currently selected host device 102 match the HBA configurations specified in the configuration database 110. The list of all HBAs for the currently selected host device 102 are analyzed to check the HBA attributes against the information in the configuration database 110. If the attributes match, the HBA configuration is valid. If not, the HBA configuration is flagged as invalid. Status results are then provided for all HBAs in the currently selected host device 102. If there are additional host devices 102 to check, the process loops back. Otherwise, the host HBA connections validation procedure is completed. Similar techniques may be used to validate HBA connections for the storage systems 106. Different rules or policies, however, may be used for the HBA connections for the storage systems 106 relative to the host devices 102. Such rules or policies, which may be obtained from or derived from policy engine 112, in some embodiments are used to prevent over-saturation of storage systems 106 by host connections. The rules may thus be specifically tailored to the needs of a particular infrastructure environment.

In some embodiments, the automated switch fabric configuration system 108 utilizes various information for configuring and validating switch zones 103 in the switch fabric 101. For example, the automated switch fabric configuration system 108 may utilize host WWPNs for each host FC port and hostnames for the host devices 102. Slot and port names for each host FC port may also be utilized (e.g., such as for ensuring that cabling or connections are in the same slots for different servers or other host devices 102 in a particular FC switch zone 103). The automated switch fabric configuration system 108 further utilizes host association to group hosts for accessing a same LUN or cluster, such as a VMWare® ESX® cluster. The automated switch fabric configuration system 108 also utilizes information regarding a fabric switch management interface IP address and associated credentials of FC switches 104, such as for connected host if aliasing port names. The automated switch fabric configuration system 108 further utilizes information regarding storage systems 106, such as a storage array management interface IP address and associated credentials, WWPNs for storage arrays or other storage devices in storage systems, etc.

In some embodiments, a set of naming conventions for the switch fabric 101 is used, such as naming conventions for the switch zones 103, zone sets, port aliases, etc. Zone member standards may also be utilized, such as single initiator, multiple target or other limitations. Regarding the switch fabric 101, rules may be obtained or derived from policy engine 112 for determining how to distribute host bus adapter (HBA) ports across the switch fabric 101 and among multiple switch fabrics. Information from configuration database 110 or from rules obtained or derived from policy engine 112 may be used to determine which switch to configure on (e.g., which of FC switches 104 a particular host device 102 is connected to, etc.).

A set of naming conventions may also be utilized for storage groups of storage systems 106. Rules may be obtained or derived from policy engine 112 regarding how to distribute connectivity across storage array ports/resources of the storage systems 106, including determining which storage array a host device 102 resides on. In some embodiments, "odd" and "even" designations for host devices 102 may be used to avoid storage array or storage system 106 port saturation, and for host durability. Odd-numbered host devices 102 may be assigned to odd-numbered switch ports on the FC switches 104 and to odd-numbered HBA ports of the storage systems 106. Similarly, even-numbered host devices 102 may be assigned to even-numbered switch ports on the FC switches 104 and to even-numbered HBA ports of the storage systems 106. For example, a host device 102 designated "host 1" on a bottom of a rack may be connected to switch port 1 on each of the FC switches 104 it is connected to, and from the FC switches 104 to odd-numbered ports of the storage systems 106. The notation of "odd" and "even" is arbitrary, but such notation or other notation may be designed to facilitate consistent deployment across infrastructure environments and to simplify troubleshooting.

In some embodiments, the automated switch fabric configuration system 108 is further configured to handle failures (e.g., of particular host devices 102, FC switches 104 and/or storage systems 106, for a particular switch zone set configuration, etc.) by rolling back (e.g., deleting) prior changes and attempting to recreate. For example, if old components of a storage array of a given storage system 106 are left out, creation steps may fail with an error and stop on a second or subsequent attempt. In the switch fabric 101, however, it may be desired to leave an older switch zone set for investigative purposes.

The automated switch fabric configuration system 108 may be further configured to store configurations (e.g., desired configurations or configurations of switch zone sets that are implemented in the switch fabric 101) in configuration database 110 or in other memory or storage. Stored configurations make automated re-provisioning easier, and can also make reporting easier. In some cases, however, stored configurations may allow for breakage or other error and thus less robust automated configuration, such as in the event that manual changes are made after a deployment which would circumvent the automated process for a stored configuration.

Although not explicitly shown in FIG. 1, one or more input-output devices such as keyboards, displays or other types of input-output devices may be used to support one or more user interfaces to the host devices, 102, FC switches 104, storage systems 106, automated switch fabric configuration system 108, configuration database 110, policy engine 112, as well as to support communication between such elements and other related systems and devices not explicitly shown.

It is to be appreciated that the particular arrangement of the switch fabric 101, switch zones 103, host devices 102, FC switches 104, storage systems 106, automated switch fabric configuration system 108, configuration database 110 and policy engine 112 in the FIG. 1 embodiment is presented by way of example only, and alternative arrangements can be used in other embodiments. For example, in some embodiments the configuration database 110 and/or policy engine 112 may be implemented at least partially internal to the automated switch fabric configuration system 108. As another example, functionality associated with the fabric configuration module 180, host and storage configuration module 182 and configuration validation module 184 may be combined into fewer modules, or separated across more modules with the multiple modules possibly being implemented with multiple distinct processors.

At least portions of the fabric configuration module 180, host and storage configuration module 182 and configuration validation module 184 may be implemented at least in part in the form of software that is stored in memory and executed by a processor.

It is to be understood that the particular set of elements shown in FIG. 1 for automated fabric configuration is presented by way of illustrative example only, and in other embodiments additional or alternative elements may be used. Thus, another embodiment may include additional or alternative systems, devices and other network entities, as well as different arrangements of modules and other components.

The automated switch fabric configuration system 108, and possibly other components of the system 100 may be implemented at least in part using one or more processing platforms as will be described in further detail below with respect to FIGS. 5 and 6.

Figure 2:
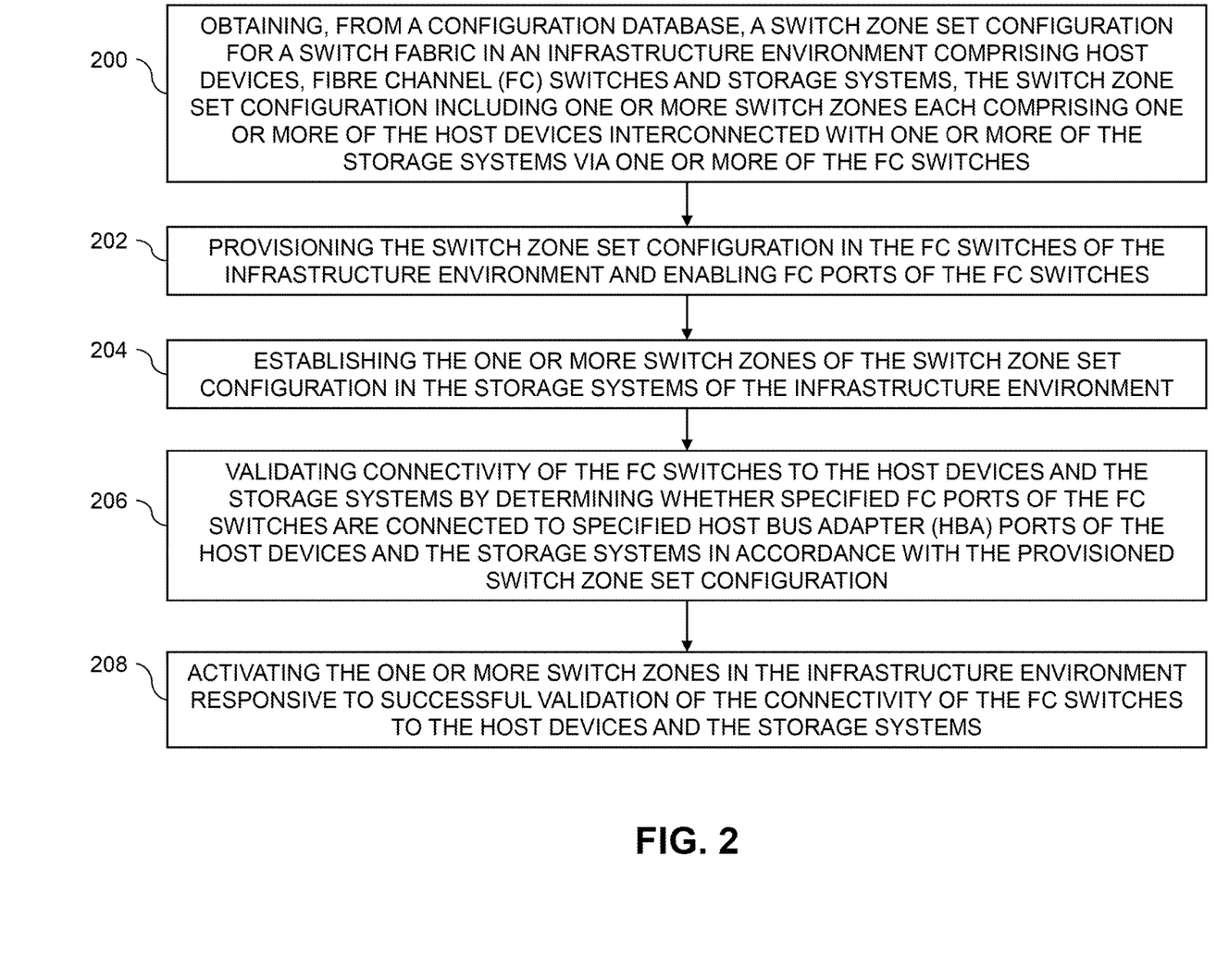
FIG. 2 is a flow diagram of an exemplary process for automated switch fabric configuration in an illustrative embodiment.

An exemplary process for automated fabric configuration will now be described in more detail with reference to the flow diagram of FIG. 2. It is to be understood that this particular process is only an example, and that additional or alternative processes for automated fabric configuration routing can be carried out in other embodiments.

In this embodiment, the process includes steps 200 through 208. These steps are assumed to be performed by the automated switch fabric configuration system 108. The process begins with step 200, obtaining, from a configuration database 110, a switch zone set configuration for a switch fabric 101 in an infrastructure environment comprising a plurality of host devices 102, a plurality of FC switches 104 and a plurality of storage systems 106. The switch zone set configuration comprises one or more switch zones 103 each comprising one or more of the host devices 102 interconnected with one or more of the storage systems 106 via one or more of the FC switches 104.

In step 202, the switch zone set configuration is provisioned in the FC switches 104 of the infrastructure environment and FC ports of the FC switches 104 are enabled. In some embodiments, step 202 may include aliasing FC switch port names to HBA port names of the host devices 102 and the storage systems 106, cloning an active switch zone set configuration of the FC switches 104 to a new switch zone set configuration, creating the one or more switch zones in the new switch zone set by mapping HBA ports of the host devices 102 to HBA ports of the storage systems 106, and activating the new switch zone set configuration in the FC switches 104. The HBA port names may comprise WWPNs.

In step 204, the one or more switch zones of the switch zone set configuration are established in the storage systems 106 of the infrastructure environment. Step 204 may include, at a given one of the storage systems 106, creating a host group, creating a port group and creating a masking view. The host group identifies one or more of the plurality of host devices 102 as members of a given switch zone 103. The port group identifies one or more HBA ports of the given storage system 106 for the given switch zone 103. The masking view enforces access policies for the given switch zone 103 by mapping identifiers of the host devices 102 in the host group to: (i) the identified HBA ports of the port group; and (ii) one or more LUNs of a storage cluster comprising at least the given storage system 106.

The process continues with step 206, validating connectivity of the FC switches 104 to the host devices 102 and the storage systems 106 by determining whether specified FC ports of the FC switches 104 are connected to specified HBA ports of the host devices 102 and the storage systems 106 in accordance with the provisioned switch zone set configuration. The process concludes in step 208 with activating the one or more switch zones in the infrastructure environment responsive to successful validation of the connectivity of the FC switches 104 to the host devices 102 and the storage systems 106.

In some embodiments, validating the connectivity in step 206 includes validating a switch zoning configuration of the FC switches 104. Validating the switch zoning configuration of a given FC switch 104 may comprise obtaining a list of expected switch connections for the given FC switch 104 from the configuration database 110, analyzing the expected switch connections to build a list of switch zones and switch zone members for each of the switch zones, the switch zone members comprising respective ones of the host devices 102 and the storage systems 106, validating that a current configuration of the given FC switch 104 comprises a provisioned switch zone set including each of the switch zones in the list with its associated switch zone members, validating that the provisioned switch zone set is active in the current configuration of the given FC switch 104, and committing the current configuration of the given FC switch 104.

Validating the connectivity in step 206 may also or alternatively include validating switch port connections of the FC switches 104. Validating the switch port connections of the FC switches 104 may comprise obtaining a list of the FC switches 104 in the infrastructure environment and associated expected switch port connections from the configuration database 110, and validating the switch port configuration of a given FC switch 104 by comparing a set of expected switch port connections for the given FC switch 104 with a set of actual connections to the switch ports for the given FC switch 104. Validating the switch port configuration of the given FC switch 104 may comprise, for a given actual switch connection, determining whether the given actual switch connection is in the set of expected switch port connections for the given FC switch 104 and validating that the given actual switch connection is on an expected FC port of the given FC switch 104.

Validating connectivity in step 206 may further or alternatively include validating HBA connections of the host devices 102 and the storage systems 106. Validating the HBA connections of the host devices and the storage systems may comprise obtaining a list of HBA attributes for the host devices 102 and the storage systems 106 in the infrastructure environment from the configuration database 110, and validating the HBA attributes for a given one of the host devices 102 or storage systems 106 by comparing a set of expected HBA attributes for the given host device or storage system with an actual HBA configuration of the given host device or storage system. Validating the HBA attributes of the given host device or storage system may comprise obtaining a list of expected HBAs and associated HBA attributes and port interfaces for the given host device or storage system from the configuration database 110, connecting to the given host device or storage system to gather a list of installed HBAs and associated HBA attributes and port interfaces, and checking whether: (i) the installed HBAs are defined in the list of expected HBAs; and (ii) whether the HBA attributes and port interfaces for the installed HBAs match the expected HBA attributes and port interfaces for the given host device or storage system obtained from the configuration database.

Figure 3:
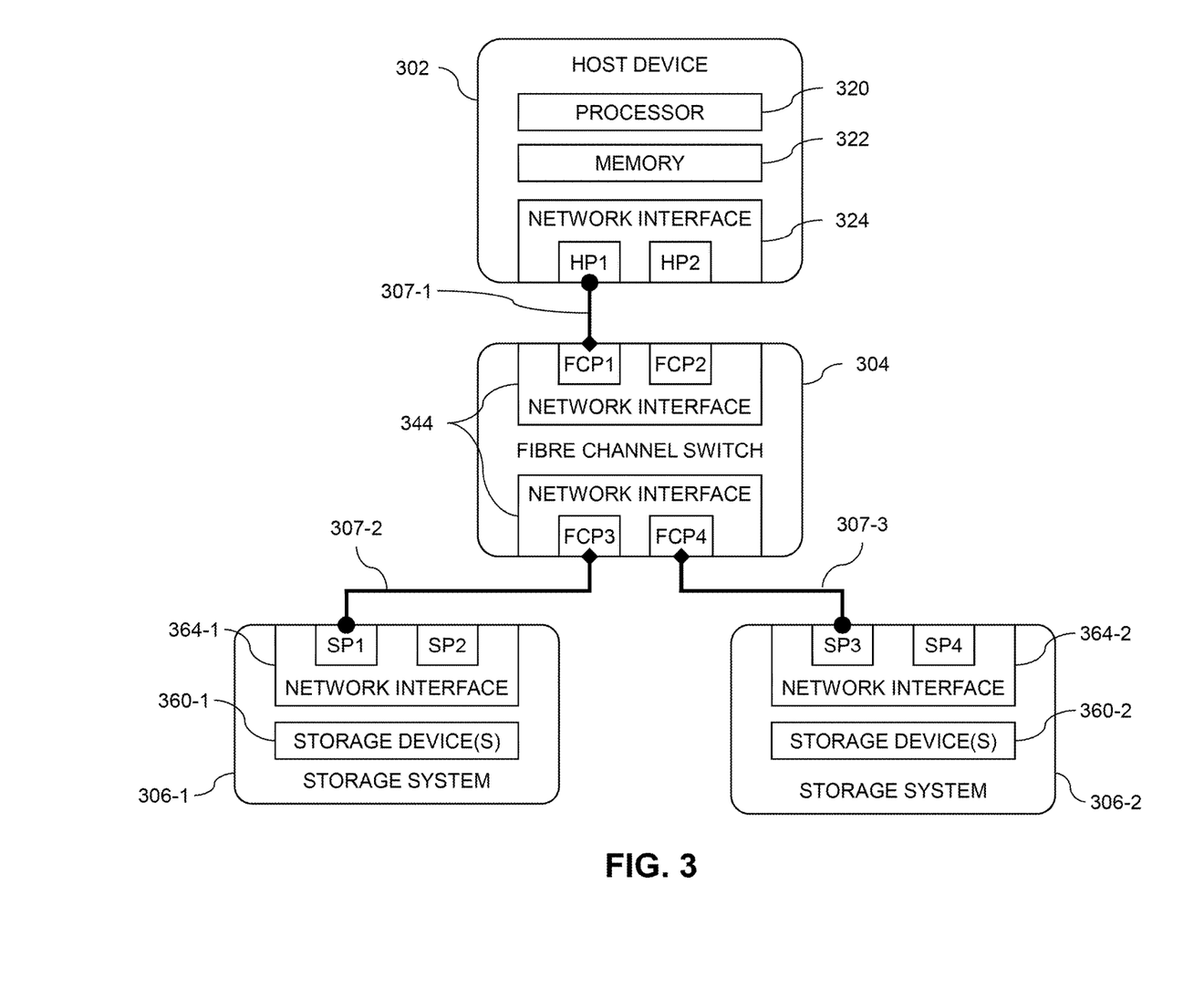
FIG. 3 is an example of a switch fabric zone in an illustrative embodiment.

Configuration of switch fabrics, including switch zones or a switch zone set within switch fabrics, is a complex task. FIG. 3 illustrates an example of a simple switch fabric zone including a single host device 302 connected with two storage systems 306-1 and 306-2 (collectively, storage systems 306) via a FC switch 304. The host device 302 is shown including a processor 320, memory 322 and network interface 324 with FC ports labeled HP1 and HP2 (e.g., host ports one and two, respectively). The FC switch 304 includes a network interface 344 with a number of FC ports labeled FCP1, FCP2, FCP3 and FCP4 (e.g., Fibre Channel switch ports one, two, three and four, respectively). Storage systems 306-1 and 306-2 each include one or more storage devices 360-1 and 360-2, respectively. Storage system 306-1 includes a network interface 364-1 having FC ports labeled SP1 and SP2 (e.g., storage system ports one and two, respectively), and storage system 306-2 includes a network interface 364-2 having FC ports labeled SP3 and SP4 (e.g., storage system ports three and four, respectively). Cabling or interconnects 307-1, 307-2 and 307-3 (collectively, cables or interconnects 307) are provided to interconnect the host device 302 with the storage systems 306 via FC switch 304. Each of the cables 307 has a first end denoted with a circle shape and a second end denoted with a diamond shape as shown in FIG. 3.

The labeling of the FC ports of host device 302, FC switch 304 and storage systems 306, as well as the labeling of different ends of the cables 307, may be in accordance with an external system of records (e.g., such as by serial numbers, barcodes or other identifiers printed on cables, above or next to FC ports, etc.). The labels may be identified using a scanning device configured to store such labels in a configuration database such as configuration database 110.

The switch zone shown in FIG. 3 illustrates an example of a valid configuration, where the cables 307 have respective ends which are plugged into desired FC ports of the network interfaces 324, 344 and 364 of the host device 302, FC switch 304 and storage systems 306. The host device 302 may represent a server, whose configuration is read by an automated fabric configuration system to understand the HBAs or FC ports that are available and designated for connection to particular switch zones.

While FIG. 3 shows a simple example where host device 302 has only one connection to the FC switch 304 (e.g., via cable 307-1 coupling HP1 to FCP1), embodiments are not so limited. The host device 302 in some embodiments may be connected to other sets of storage systems not shown in FIG. 3 via the FC switch 304 or via another FC switch not shown. Further, the host device 302 may in some cases have redundant connections for a particular switch zone. Thus, there may be redundant cabling connections between the host device 302 and FC switch 304 (e.g., via another cable not shown in FIG. 3 coupling HP2 to FCP2). Redundancy may additionally or alternatively be provided by another cable coupling HP2 to a FC port of another FC switch not shown in FIG. 3. Various other arrangements are possible. Similarly, there may be redundancy built in for connections between the storage systems 306 and the FC switch 304 (or other FC switches not shown in FIG. 3). Also, one or both of the storage systems 306 may also be configured for connection to the FC switch 304 or another FC switch not shown in FIG. 3 for an additional switch zone including one or more host devices in addition to or in place of host device 302.

As the number of host devices, FC switches, storage systems, switch zones, redundancy requirements, etc. increase, the complexity of determining whether a particular configuration is valid becomes more and more difficult. In some cases, mere physical connection of host devices, FC switches and storage systems is not enough—a valid configuration may require that particular host devices, FC switches and storage systems are interconnected via particular FC ports, with particular cables or interconnects (e.g., including particular ends thereof) for ease of servicing and other desired characteristics.

Figure 4:
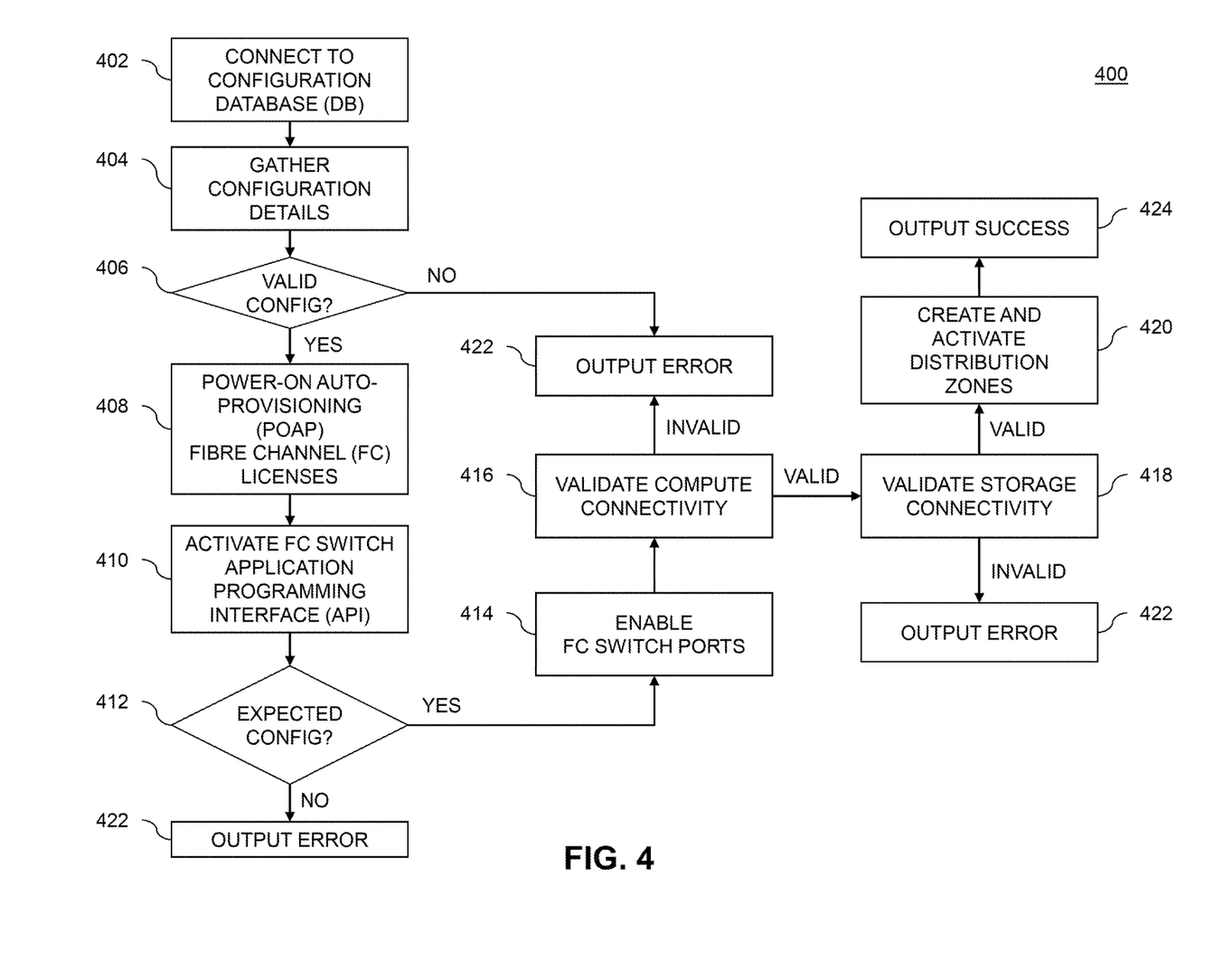
FIG. 4 is a flow diagram of another exemplary process for automated switch fabric configuration in an illustrative embodiment.

FIG. 4 is a flow diagram of a process 400 for automated fabric configuration, which may be performed using automated switch fabric configuration system 108. The process 400 begins in step 402 with connecting to a configuration database such as configuration database 110. In step 404, configuration details for a particular switch fabric or switch zone set (e.g., of a rack or other infrastructure) are gathered from the configuration database. In step 406, it is determined whether the configuration details are valid. This may involve comparison of the configuration details against a set of pre-defined rules, which may be obtained or derived from a policy engine such as policy engine 112. If valid, the process 400 continues with step 408. If not valid, the process 400 ends by outputting an error 422. In some embodiments, the error output in step 422 may detail which rules are broken by configuration details, or other information useful for remedying the error.

Step 408 includes power-on auto-provisioning (POAP) of FC licenses and other software, followed by activating a FC switch API for FC switches in the switch zone in step 410. In some embodiments, the FC switch API may include an NXAPI from Cisco® or other CLI, etc. for FC switch management. In step 412, it is determined whether the FC switches have the expected configuration. If yes, the process 400 proceeds to step 414. If not, the process 400 ends by outputting error 422. The error output in step 422 may detail which of the FC switches in a particular switch fabric do not have the expected configuration, as well as details regarding which aspects of particular FC switches do not have the expected configuration.

In step 414, FC switch ports are enabled and in step 416 compute connectivity is validated. If the compute connectivity (e.g., host device-to-FC switch connectivity) is valid, the process 400 proceeds to step 418. If invalid, the process 400 ends by outputting error 422. The error output in step 422 may provide details regarding which host device or switch ports are the cause of the error, as well as other information useful for remedying the error.

In step 418, the storage connectivity is validated. If the storage connectivity (e.g., storage array or storage system-to-FC switch connectivity) is valid, the process 400 proceeds to step 420. If invalid, the process 400 ends by outputting error 422. The error output in step 422 may provide details regarding which storage system or switch ports are the cause of the error, as well as other information useful for remedying the error.

Distribution zones are created and activated in step 420 responsive to successful validation of the storage connectivity in step 418. Distribution zones refers to switch zone set distribution. In some embodiments, a switch zone set database or configuration is created and modified on a single one of the FC switches. Once the switch zones are activated on that FC switch, the changes are distributed to other FC switches in a common switch fabric. The process 400 then ends by outputting a success or complete message in step 424.

Embodiments provide various advantages for programmatically configuring switch fabrics, including configuring FC interconnects, thus enabling consistent deployment and validation of infrastructure components without requiring human intervention. Advantageously, techniques described herein for automated switch fabric configuration facilitate provisioning of IaaS, such as in cloud computing environments, data centers, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 106, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more system components in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
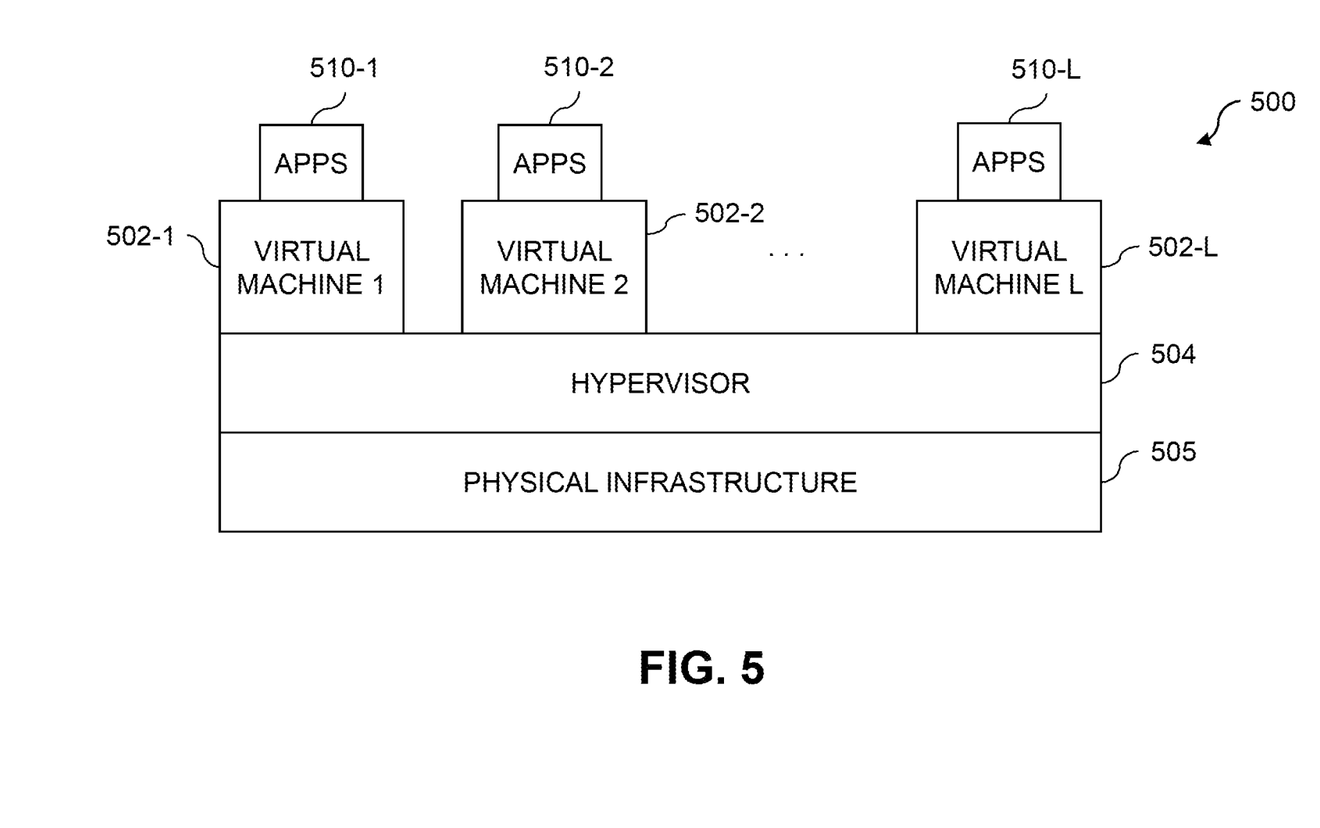
FIGS. 5 and 6 show examples of processing platforms that may be utilized to implement at least a portion of an information processing system in illustrative embodiments.
Figure 6:
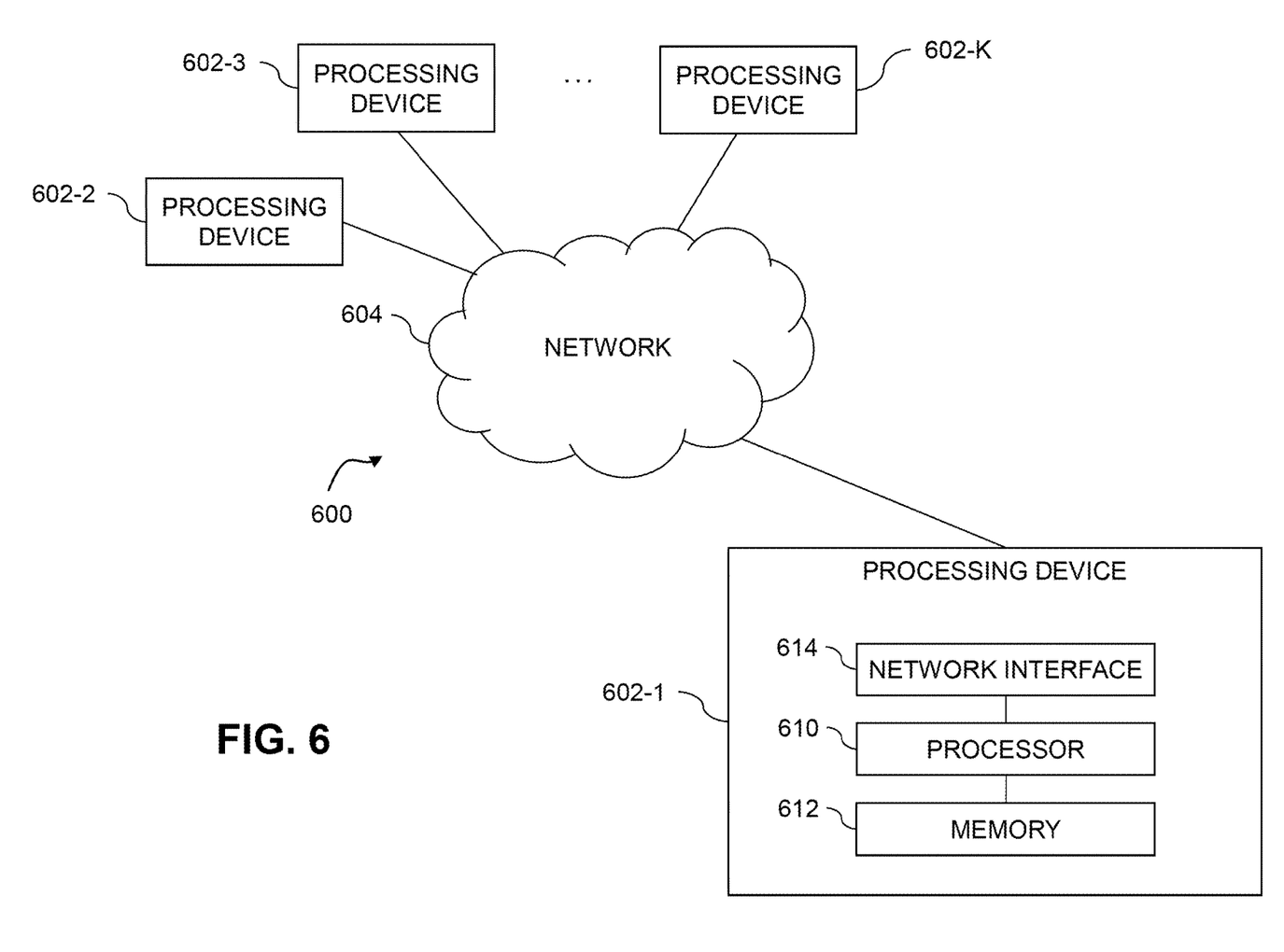

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the automated switch fabric configuration system 108 of system 100 are illustratively implemented in the form of software running on one or more processing devices.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of switches, host devices, storage arrays, cables, etc. can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
    obtaining, from a configuration database, a switch zone set configuration for a switch fabric in an infrastructure environment comprising a plurality of host devices, a plurality of Fibre Channel (FC) switches and a plurality of storage systems, the switch zone set configuration comprising one or more switch zones each comprising one or more of the host devices interconnected with one or more of the storage systems via one or more of the FC switches;
    provisioning the switch zone set configuration in the FC switches of the infrastructure environment and enabling FC ports of the FC switches;
    establishing the one or more switch zones of the switch zone set configuration in the storage systems of the infrastructure environment;
    validating connectivity of the FC switches to the host devices and the storage systems by determining whether specified FC ports of the FC switches are connected to specified host bus adapter (HBA) ports of the host devices and the storage systems in accordance with the provisioned switch zone set configuration; and
    activating the one or more switch zones in the infrastructure environment responsive to successful validation of the connectivity of the FC switches to the host devices and the storage systems;
    wherein the method is performed by at least one processing device comprising a processor coupled to a memory.

2. The method of claim 1 wherein provisioning the switch zone set configuration in the FC switches comprises:
    aliasing FC switch port names to HBA port names of the host devices and the storage systems;
    cloning an active switch zone set configuration of the FC switches to a new switch zone set configuration;
    creating the one or more switch zones in the new switch zone set by mapping HBA ports of the host devices to HBA ports of the storage systems; and
    activating the new switch zone set configuration in the FC switches.

3. The method of claim 2 wherein the HBA port names comprise World Wide Port Names (WWPNs).

4. The method of claim 1 wherein establishing the one or more switch zones of the switch zone set configuration in the storage systems of the infrastructure environment comprises, at a given one of the storage systems:
    creating a host group, the host group identifying one or more of the plurality of host devices as members of a given switch zone;
    creating a port group, the port group identifying one or more HBA ports of the given storage system for the given switch zone; and
    creating a masking view, the masking view enforcing access policies for the given switch zone by mapping identifiers of the host devices in the host group to: (i) the identified HBA ports of the port group; and (ii) one or more logical units (LUNs) of a storage cluster comprising at least the given storage system.

5. The method of claim 1 wherein validating connectivity of the FC switches to the host devices and the storage systems comprises validating a switch zoning configuration of the FC switches.

6. The method of claim 5 wherein validating the switch zoning configuration of the FC switches comprises, for a given one of the FC switches:
    obtaining a list of expected switch connections for the given FC switch from the configuration database;
    analyzing the expected switch connections to build a list of switch zones and switch zone members for each of the switch zones, the switch zone members comprising respective ones of the host devices and the storage systems;
    validating that a current configuration of the given FC switch comprises a provisioned switch zone set including each of the switch zones in the list with its associated switch zone members;
    validating that the provisioned switch zone set is active in the current configuration of the given FC switch; and
    committing the current configuration of the given FC switch.

7. The method of claim 1 wherein validating connectivity of the FC switches to the host devices and the storage systems comprises validating switch port connections of the FC switches.

8. The method of claim 7 wherein validating the switch port connections of the FC switches comprises:
    obtaining a list of the FC switches in the infrastructure environment and associated expected switch port connections from the configuration database; and
    validating the switch port configuration of a given FC switch by comparing a set of expected switch port connections for the given FC switch with a set of actual connections to the switch ports for the given FC switch.

9. The method of claim 8 wherein validating the switch port configuration of the given FC switch comprises, for a given actual switch connection:
determining whether the given actual switch connection is in the set of expected switch port connections for the given FC switch; and
validating that the given actual switch connection is on an expected FC port of the given FC switch.

10. The method of claim 1 wherein validating connectivity of the FC switches to the host devices and the storage systems comprises validating HBA connections of the host devices and the storage systems.

11. The method of claim 10 wherein validating the HBA connections of the host devices and the storage systems comprises:
obtaining a list of HBA attributes for the host devices and the storage systems in the infrastructure environment from the configuration database; and
validating the HBA attributes for a given one of the host devices or storage systems by comparing a set of expected HBA attributes for the given host device or storage system with an actual HBA configuration of the given host device or storage system.

12. The method of claim 11 wherein validating the HBA attributes of the given host device or storage system comprises:
obtaining a list of expected HBAs and associated HBA attributes and port interfaces for the given host device or storage system from the configuration database;
connecting to the given host device or storage system to gather a list of installed HBAs and associated HBA attributes and port interfaces; and
checking whether: (i) the installed HBAs are defined in the list of expected HBAs; and (ii) whether the HBA attributes and port interfaces for the installed HBAs match the expected HBA attributes and port interfaces for the given host device or storage system obtained from the configuration database.

13. A computer program product comprising a non-transitory processor-readable storage medium having stored therein program code of one or more software programs, wherein the program code when executed by at least one processing device cause the at least one processing device:
to obtain, from a configuration database, a switch zone set configuration for a switch fabric in an infrastructure environment comprising a plurality of host devices, a plurality of Fibre Channel (FC) switches and a plurality of storage systems, the switch zone set configuration comprising one or more switch zones each comprising one or more of the host devices interconnected with one or more of the storage systems via one or more of the FC switches;
to provision the switch zone set configuration in the FC switches of the infrastructure environment and enabling FC ports of the FC switches;
to establish the one or more switch zones of the switch zone set configuration in the storage systems of the infrastructure environment;
to validate connectivity of the FC switches to the host devices and the storage systems by determining whether specified FC ports of the FC switches are connected to specified host bus adapter (HBA) ports of the host devices and the storage systems in accordance with the provisioned switch zone set configuration; and
to activate the one or more switch zones in the infrastructure environment responsive to successful validation of the connectivity of the FC switches to the host devices and the storage systems.

14. The computer program product of claim 13 wherein provisioning the switch zone set configuration in the FC switches comprises:
aliasing FC switch port names to HBA port names of the host devices and the storage systems;
cloning an active switch zone set configuration of the FC switches to a new switch zone set configuration;
creating the one or more switch zones in the new switch zone set by mapping HBA ports of the host devices to HBA ports of the storage systems; and
activating the new switch zone set configuration in the FC switches.

15. The computer program product of claim 13 wherein establishing the one or more switch zones of the switch zone set configuration in the storage systems of the infrastructure environment comprises, at a given one of the storage systems:
creating a host group, the host group identifying one or more of the plurality of host devices as members of a given switch zone;
creating a port group, the port group identifying one or more HBA ports of the given storage system for the given switch zone; and
creating a masking view, the masking view enforcing access policies for the given switch zone by mapping identifiers of the host devices in the host group to: (i) the identified HBA ports of the port group; and (ii) one or more logical units (LUNs) of a storage cluster comprising at least the given storage system.

16. The computer program product of claim 13 wherein validating connectivity of the FC switches to the host devices and the storage systems comprises validating a switch zoning configuration of the FC switches, validating switch port connections of the FC switches and validating HBA connections of the host devices and the storage systems.

17. An apparatus comprising:
at least one processing device comprising a processor coupled to a memory;
the at least one processing device being configured:
to obtain, from a configuration database, a switch zone set configuration for a switch fabric in an infrastructure environment comprising a plurality of host devices, a plurality of Fibre Channel (FC) switches and a plurality of storage systems, the switch zone set configuration comprising one or more switch zones each comprising one or more of the host devices interconnected with one or more of the storage systems via one or more of the FC switches;
to provision the switch zone set configuration in the FC switches of the infrastructure environment and enabling FC ports of the FC switches;
to establish the one or more switch zones of the switch zone set configuration in the storage systems of the infrastructure environment;
to validate connectivity of the FC switches to the host devices and the storage systems by determining whether specified FC ports of the FC switches are connected to specified host bus adapter (HBA) ports of the host devices and the storage systems in accordance with the provisioned switch zone set configuration; and to activate the one or more switch zones in the infrastructure environment responsive to successful validation of the connectivity of the FC switches to the host devices and the storage systems.

18. The apparatus of claim 17 wherein provisioning the switch zone set configuration in the FC switches comprises:
aliasing FC switch port names to HBA port names of the host devices and the storage systems;
cloning an active switch zone set configuration of the FC switches to a new switch zone set configuration;
creating the one or more switch zones in the new switch zone set by mapping HBA ports of the host devices to HBA ports of the storage systems; and
activating the new switch zone set configuration in the FC switches.

19. The apparatus of claim 17 wherein establishing the one or more switch zones of the switch zone set configuration in the storage systems of the infrastructure environment comprises, at a given one of the storage systems:
creating a host group, the host group identifying one or more of the plurality of host devices as members of a given switch zone;
creating a port group, the port group identifying one or more HBA ports of the given storage system for the given switch zone; and
creating a masking view, the masking view enforcing access policies for the given switch zone by mapping identifiers of the host devices in the host group to: (i) the identified HBA ports of the port group; and (ii) one or more logical units (LUNs) of a storage cluster comprising at least the given storage system.

20. The apparatus of claim 17 wherein validating connectivity of the FC switches to the host devices and the storage systems comprises validating a switch zoning configuration of the FC switches, validating switch port connections of the FC switches and validating HBA connections of the host devices and the storage systems.

* * * * *